(12) United States Patent
Cai (10) Patent No.: US 8,233,807 B2
(45) Date of Patent: Jul. 31, 2012

(54) OPTICAL PULSE AMPLICATION APPARATUS AND METHOD

(75) Inventor: Yuanmin Cai, Tenafly, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/190,091

(22) Filed: Jul. 25, 2011

(65) Prior Publication Data

US 2011/0280585 A1 Nov. 17, 2011

Related U.S. Application Data

(62) Division of application No. 11/762,337, filed on Jun. 13, 2007, now Pat. No. 8,036,537.

(51) Int. Cl.
*H04B 10/00* (2006.01)
(52) U.S. Cl. ........ 398/180; 398/160; 398/148; 398/154; 398/179; 398/155; 398/175
(58) Field of Classification Search ................... 398/160, 398/180, 148, 154, 175, 179, 155
See application file for complete search history.

(56) References Cited

U.S. PATENT DOCUMENTS

| | | | |
|---|---|---|---|
| 4,136,929 A | 1/1979 | Suzaki | |
| 4,738,503 A | 4/1988 | Desurvire et al. | |
| 4,794,598 A | 12/1988 | Desurvire et al. | |
| 4,815,804 A | 3/1989 | Desurvire et al. | |
| 5,212,711 A | 5/1993 | Harvey et al. | |
| 5,287,316 A | 2/1994 | Urushidani et al. | |
| 5,309,455 A | 5/1994 | Adachi et al. | |
| 5,436,925 A | 7/1995 | Lin et al. | |
| 5,493,433 A | 2/1996 | Prucnal et al. | |

(Continued)

FOREIGN PATENT DOCUMENTS

JP 5-21880 1/2007

OTHER PUBLICATIONS

Haykin, et al., "Signals and Systems", 1999, pp. 70-81.

*Primary Examiner* — Danny Leung
(74) *Attorney, Agent, or Firm* — Scully, Scott, Murphy & Presser, P.C.; Joseph P. Abate, Esq.

(57) ABSTRACT

A method and apparatus for producing a series of amplified optical pulses from a series of input optical pulses. The method includes creating a set of local optical pulses from a series of input optical pulses, the set of local optical pulses being applied to the input of an optical amplifier and having different amplitudes arranged in a graded order. The set of local optical pulses are amplified by an optical amplifier to have a significantly amplified first local optical pulse that is removed from the set of local optical pulses and output as a part of the series of amplified optical pulses. After removing the significantly amplified first local optical pulse, the set of local optical pulses is recreated by adding a new optical pulse from the series of input optical pulses to the end of the set of local optical pulses; and the recreated set of local optical pulses is routed back to be applied to the input of the optical amplifier to continue producing the series of amplified optical pulses. The formed set of local optical pulses having different (graded) amplitudes arranged in a descending order is configured such that the first local optical pulse has a much higher peak power before the optical amplifier gets saturated.

8 Claims, 7 Drawing Sheets

U.S. PATENT DOCUMENTS

| | | | |
|---|---|---|---|
| 5,499,134 A | 3/1996 | Galvanauskas et al. |
| 5,589,929 A | 12/1996 | Li |
| 5,590,142 A | 12/1996 | Shan |
| 5,646,774 A | 7/1997 | Takara et al. |
| 5,699,371 A | 12/1997 | Handa et al. |
| 5,740,117 A | 4/1998 | Bona et al. |
| 6,011,506 A | 1/2000 | Li |
| RE37,561 E | 2/2002 | Li |
| 6,396,856 B1 | 5/2002 | Sucha et al. |
| 6,469,778 B2 | 10/2002 | Asaka et al. |
| 6,590,910 B2 | 7/2003 | Lin |
| 6,594,053 B1 | 7/2003 | Lee et al. |
| 6,618,531 B1 | 9/2003 | Goto et al. |
| 6,819,817 B2 | 11/2004 | Kaneko et al. |
| 6,842,548 B2 | 1/2005 | Loock et al. |
| 6,856,770 B2 | 2/2005 | Bai |
| 7,027,217 B2 | 4/2006 | Kanou |
| 7,068,360 B2 | 6/2006 | Ohta |
| 7,099,593 B1 | 8/2006 | Islam et al. |
| 7,444,049 B1 | 10/2008 | Kim et al. |
| 7,492,795 B1 | 2/2009 | Delfyett et al. |
| 7,505,196 B2 | 3/2009 | Nati et al. |
| 7,626,758 B2 | 12/2009 | Nati et al. |
| 7,636,524 B2 | 12/2009 | Dorring et al. |
| 7,667,889 B2 | 2/2010 | Murison et al. |
| 2006/0018349 A1 | 1/2006 | Kopf et al. |
| 2008/0030847 A1 | 2/2008 | Murison et al. |
| 2008/0205883 A1 | 8/2008 | Jolly |
| 2008/0310859 A1 | 12/2008 | Cai |

OPTICAL PULSE AMPLICATION APPARATUS AND METHOD

RELATED APPLICATIONS

This application is a divisional of U.S. application Ser. No. 11/762,337, filed Jun. 13, 2007.

BACKGROUND

1. Field of the Invention

The present invention relates generally to processing and amplification of optical signals, and particularly, to a novel pulse amplification apparatus and method of operation that provides enhanced optical signal gain at reduced cost and complexity.

2. Description of the Prior Art

Figure 1:
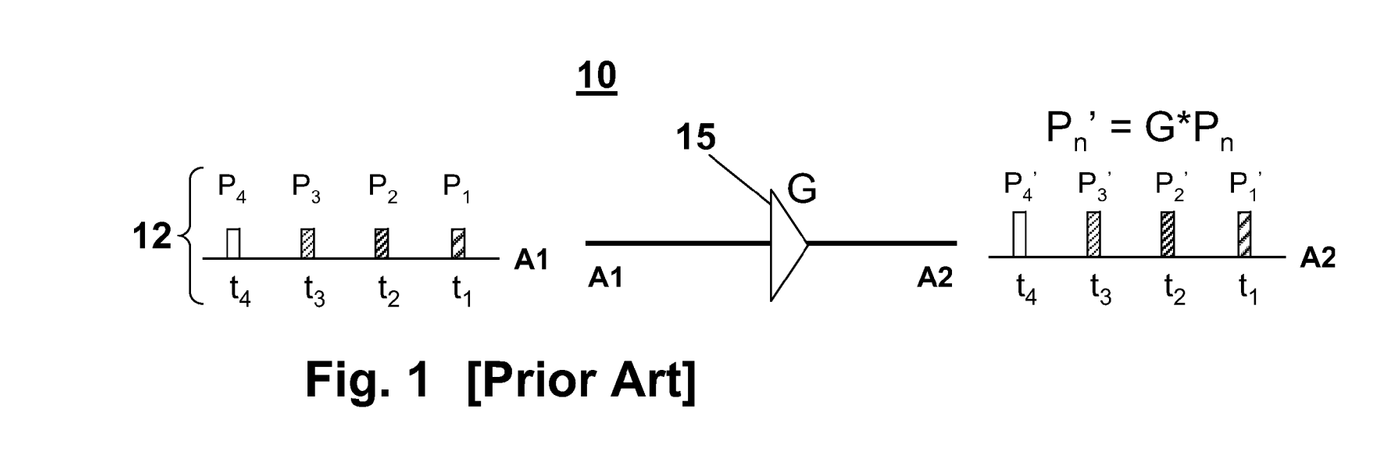
FIG. 1 depicts generally a prior art optical pulse amplifier apparatus 10.

Optical pulses have found wide applications in, for example, telecommunication, medical equipments/devices, testing and measurement equipments, food/agricultural industries, and even military/weaponry applications. Among key properties of a series of optical pulses are the duration of the pulses, peak intensity, and repetition rate. Other properties may include rise/fall time of the pulse shape and wavelength of the light. Normally, a series of optical pulses generated by a laser diode (LD), or a light-emitting diode (LED), may not have the intensity sufficient for most of the applications such as, for example, medical devices. Therefore, the intensity of optical pulses may need to be boosted, or amplified, to reach a certain required peak power level. For example, FIG. 1 depicts a prior art optical pulse amplifier apparatus 10 that includes amplifier device 15 for amplifying laser diode generated optical pulses 12, labeled $P_1, \ldots P_4$, with fixed pulse width at predetermined time interval $t_1, \ldots, t_4$, respectively. In this example, the amplifier device may be characterized by a gain (G) of, e.g., about 10 dB to 15 dB. With an input pulse of peak power about −10 dBm to −15 dBm, by applying this prior art apparatus 10, an output pulse may be obtained having a peak power ranging from about −5 dBm to about +5 dBm. It is apparent that, for some applications, this apparatus 10 may not provide optical pulses with sufficient peak power.

Figure 2A:
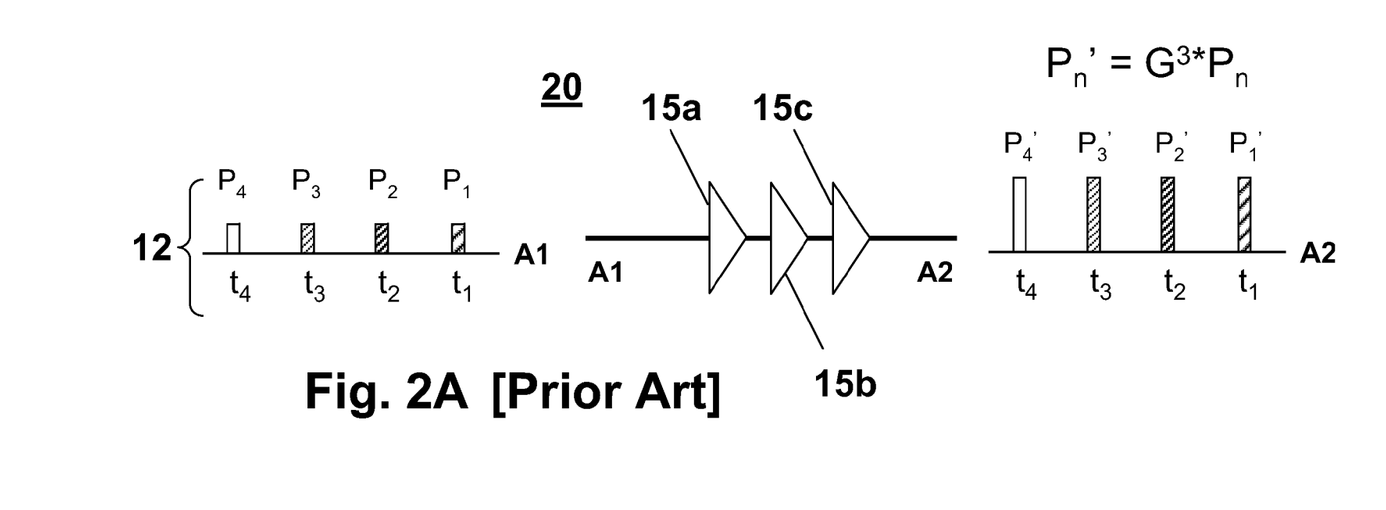
FIG. 2A depicts generally an optical pulse amplifier apparatus incorporating a series of optical signal amplifiers that are cascaded to provide larger gain to the optical pulses according to the prior art.
Figure 2B:
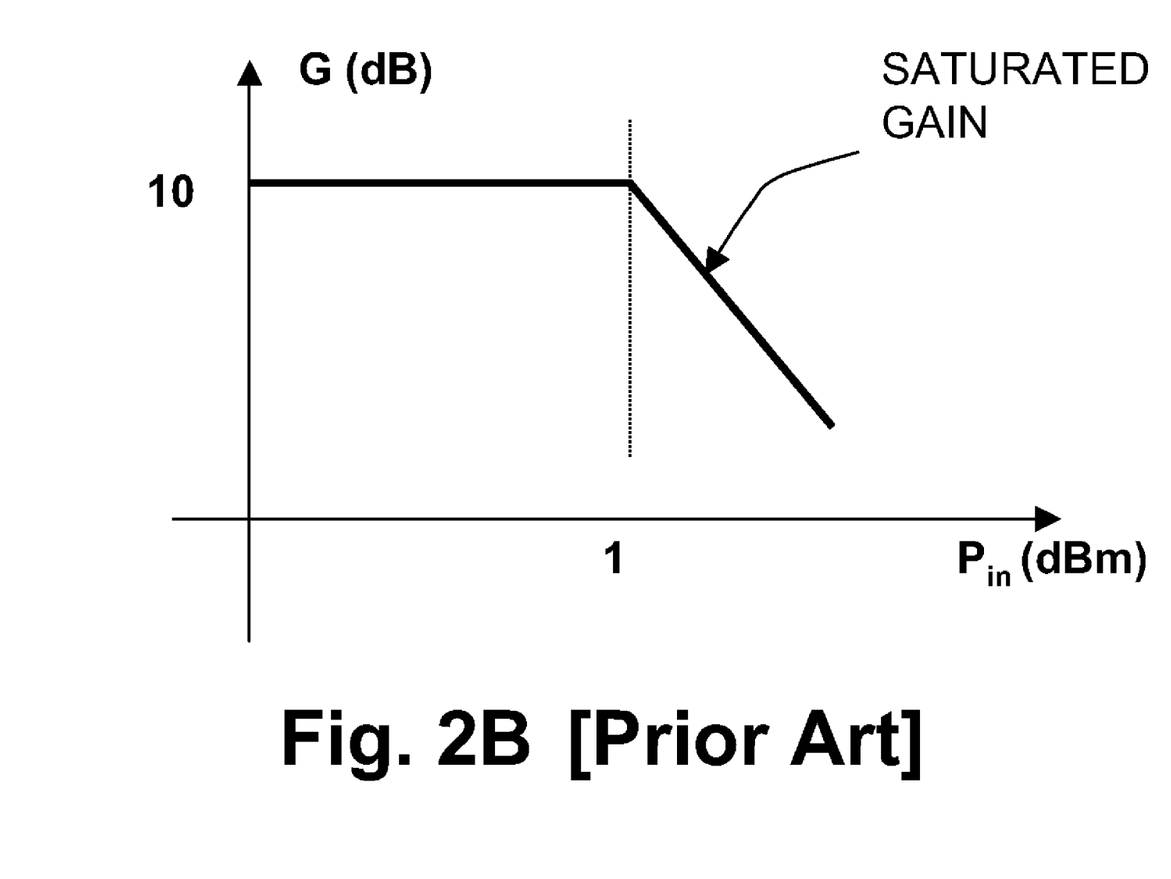
FIG. 2B depicts an optical pulse amplifier apparatus response characteristic showing the early onset of amplifier saturation for the prior art optical pulse amplifier apparatus of FIG. 2A.

In a further prior art apparatus 20, depicted in FIG. 2A, a series of optical signal amplifiers 15a, 15b, 15c, for example, are cascaded to provide larger amplification/gain to the optical pulses 12, labeled $P_1, \ldots, P_4$, as in FIG. 1. In this example, the output pulse peak power, which may be estimated as $P'n=G^3*Pn$, may achieve an output pulse peak power level higher than that by using prior art apparatus 10. In the above equation, Pn denotes peak power of input pulse n, P'n denotes peak power of amplified output, and G denotes gain of each optical signal amplifier 15a, 15b, and 15c (assuming all three amplifiers have the same gain). However, such an apparatus 20 has drawbacks which may include, for example, the high cost associated with using multiple amplifiers and an early point of saturation, e.g., at +11 dBm output, such as shown in FIG. 2B, although some un-proportionally expensive amplifiers may provide a higher saturated output power.

Therefore, it would be highly desirable to provide a novel optical pulse amplification apparatus that enhances amplification of a series of optical pulse signals so as to achieve certain required peak power levels.

SUMMARY OF THE INVENTION

The present invention is directed to a pulse amplification apparatus and methodology employing an optical amplifier that amplifies optical pulses through a re-circulating fiber loop and launches the amplified optical pulses through an optical switch. By careful arrangement of optical pulses in a graded series inside the apparatus and by taking advantage of the low average input power (averaged over the photon lifetime) to an optical amplifier of moderate gain, for example, a series of narrow optical pulses will experience a significantly higher total combined or accumulated gain, which would normally require a series of cascaded optical amplifiers of moderate gain or some expensive high-gain optical amplifiers. Thus, the apparatus emulates the effect of multiple optical signal amplifiers, however, by adopting a methodology of lowering average input power, through creating a graded pulse series, for delayed amplifier saturation.

Thus, according to one aspect of the invention, there is provided a method and apparatus for producing a series of amplified optical pulses from a series of input optical pulses. The method includes creating a set of local optical pulses from the series of input optical pulses, the set of local optical pulses being applied to the input of an optical amplifier and having different amplitudes arranged in a graded order. The set of local optical pulses are amplified by the optical amplifier to have a significantly amplified first local optical pulse that is removed from the set of local optical pulses and output as a part of the series of amplified optical pulses. After removing the significantly amplified first local optical pulse, the set of local optical pulses is then recreated by adding a new optical pulse from the series of input optical pulses to the end of the set of local optical pulses; and the recreated set of local optical pulses is routed back to be applied to the input of the optical amplifier to continue producing the series of amplified optical pulses. The formed set of local optical pulses having different (graded) amplitudes arranged in a descending order is configured such that the first local optical pulse has a much higher peak power before the optical amplifier gets saturated.

In a further aspect of the invention, an optical arrangement for producing a series of amplified optical pulses from a series of input optical pulses is provided. The arrangement includes an optical loop having at least an optical amplifier and an optical fiber; and a two-by-two optical switch having an input port, an output port, a third port being connected to the input of the optical amplifier via the optical loop, and a fourth port being connected to the output of the optical amplifier via the optical loop; wherein the optical switch is adapted to allow an optical signal from an input optical pulse source to be successively added onto the optical loop to form a set of local optical pulses having different amplitudes arranged in a descending order, and allow a significantly amplified first local optical pulse of the set of local optical pulses to be removed from the optical loop and directed to the output port as a part of the series of amplified optical pulses.

In this embodiment of the optical arrangement, the optical switch is synchronized to a time interval equal to a time that a local optical pulse travels one and 1/n cycles of the optical loop, wherein n equals the number of optical pulses in the set of local optical pulses.

Further, in the optical arrangement, the significantly amplified first local optical pulse and the optical pulse from the input optical pulse source arrive, at substantially the same time, at the fourth port and the input port respectively and depart, at substantially the same time, from the output port and the third port respectively of the optical switch.

Further, in the optical arrangement, the fourth port is connected internally to the output port and the third port is connected internally to the input port of the optical switch between the arrival to the optical switch and the departure from the optical switch of the significantly amplified first local optical pulse and the optical pulse from the input optical pulse source.

According to a further aspect of the invention, a method and apparatus for providing high peak power optical pulse signals is provided. The apparatus includes a re-circulating fiber optic loop having an optical amplifier coupled therein for emulating multiple optical signal amplifiers; and, an optical switch means coupled to the re-circulating fiber optic loop and timed to admit successive optical input pulses of constant amplitude from an optical pulse source into the fiber optic loop for circulation therein, and simultaneously, at each admission, output an optical pulse that has achieved a predetermined amount of amplitude amplification after a pre-determined number of re-circulating cycles within the loop, wherein each pulse admitted into the loop being amplified by the optical amplifier in each re-circulating cycle, each successively admitted pulse always having an increased amplitude compared to each successive optical pulse admitted in the loop, whereby during steady state operation, a fixed number of local optical pulses is circulating in the fiber optic loop each at a successively greater amplitude.

Further to this embodiment, for the apparatus, the optical path length of the optical loop is adapted to be a multiple of the distance between the local optical pulses.

Moreover, in one embodiment, the optical loop further includes an optical delay line for adjusting the optical path length.

Furthermore, in one embodiment, the optical switch means is synchronized to a time interval equal to a time that a local optical pulse travels one and 1/n cycles of the fiber optic loop, wherein n equals the number of optical pulses in the set of local optical pulses.

Advantageously, in each of the embodiments of the invention, the optical switch used is a two-by-two switch that couples an input optical pulse into the fiber loop, and simultaneously couples an amplified optical signal out of the fiber loop, in a periodic fashion.

BRIEF DESCRIPTION OF THE DRAWINGS

Further features, aspects and advantages of the apparatus and methods of the present invention will become better understood with regard to the following description, appended claims, and accompanying drawings wherein:

DETAILED DESCRIPTION OF THE PREFERRED EMBODIMENTS

Figure 3:
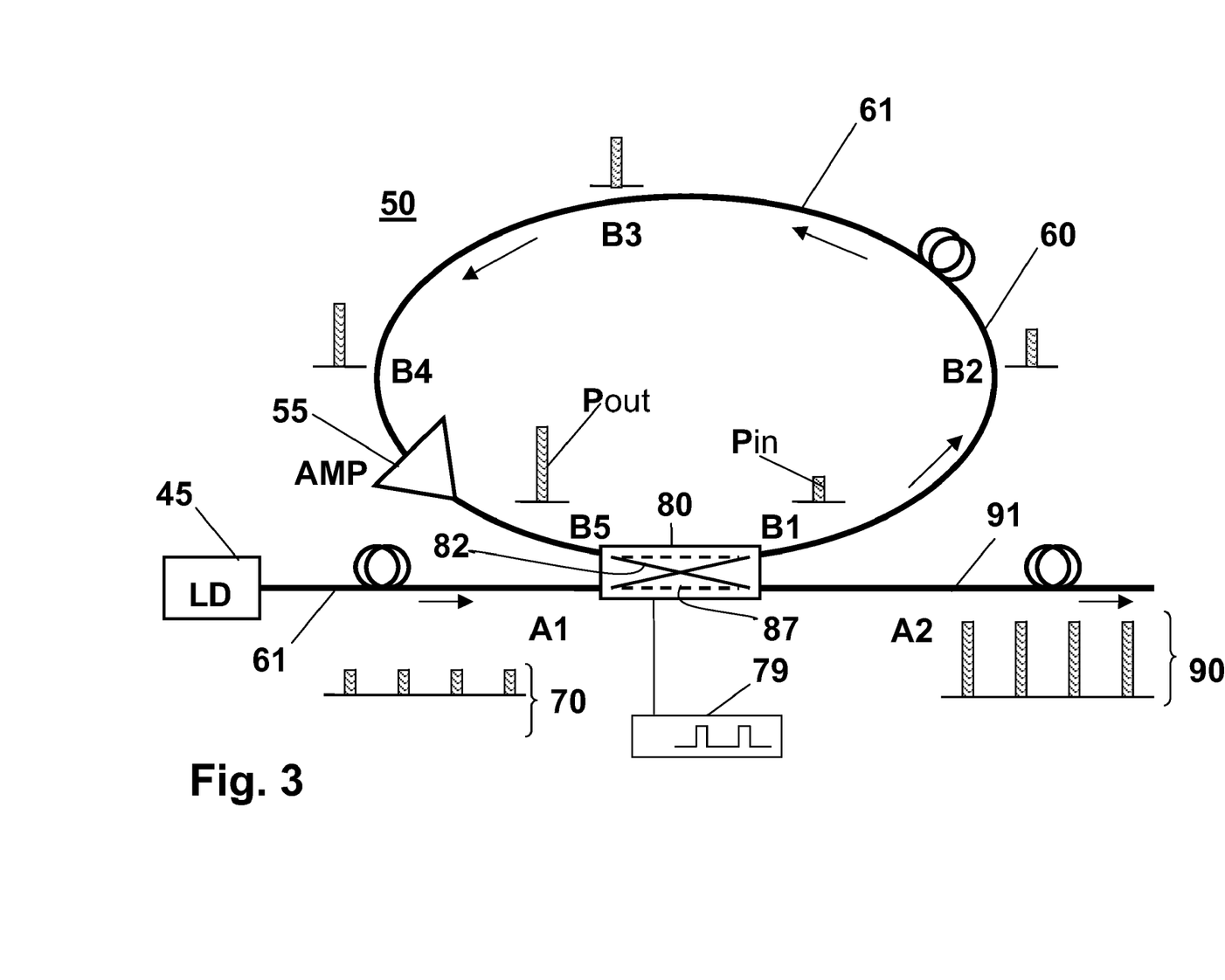
FIG. 3 depicts the pulse amplification apparatus 50 according to an example embodiment of the present invention.

FIG. 3 depicts a pulse amplification apparatus 50 according to an example embodiment of the present invention. In the apparatus depicted in FIG. 3, an optical amplifier 55 is positioned anywhere within a re-circulating fiber loop 60 to amplify optical pulses "P" propagating inside the fiber loop 60. Hereinafter, the term "fiber loop" may be used interchangeably with terms such as "fiber optic loop", "optical loop", or "optic loop". Fiber loop 60 includes at least fiber 61, optical amplifier 55, and an optical switch 80. In one embodiment, the re-circulating fiber loop 60 is of a length "L", which length is designed according to the optical pulse period (frequency) of the input optical pulse stream 70 and a desired optical pulse amplification gain criteria, as will be described in greater detail herein below. In one non-limiting embodiment, the length "L" of the fiber loop is shorter than the distance an optical pulse inside the re-circulating fiber loop 60 travels during a repetition or cycle of the series of input optical pulses.

As shown in FIG. 3, input optical pulses are provided by a laser diode (LD) or light emitting diode (LED) 45. In one non-limiting embodiment, the input pulse rate is approximately equal to or greater than 1 kBit/s (one thousand pulses per second), for example, 100 MBit/s (one hundred million pulses per second), with input pulse widths much less than the pulse cycle (ranging on the order of picoseconds to sub-milliseconds), for example, 100 ps (picoseconds). Further, it is assumed, in the embodiments described herein, that the photon lifetime inside the optical amplifier 55 is on the order of about 8~10 milliseconds, as is well known in the art for Er-doped fiber amplifier. As further shown in FIG. 3, an optical switch element 80 couples both ends of the re-circulating fiber loop 60 for admitting pulses into and out of the re-circulating fiber loop 60. In one example embodiment, the optical switch element 80 may be a four (4) port cross-bar switch (a two-by-two optical switch having four ports with a cross state/position and a bar state/position) and timed to open and close under control of switching trigger signals provided by a timing device 79. The optical switch trigger signals are timed to configure the switch element 80 in a first "cross" switch position 82 as shown in FIG. 3 for coupling an optical pulse "$P_{in}$" of input pulse stream 70 that is carried by an input fiber optic connection 61 to the re-circulating fiber loop 60 for amplification therein; and, simultaneously or at substantially the same time, for coupling an amplified local optical pulse $P_{out}$ from the re-circulating fiber loop 60 to an output fiber optic connection 91 via the optical switch 80 for carrying an output amplified pulse stream 90. The optical switch trigger signals are further timed to configure the switch element 80 in a second "bar" switch position 87 as shown in FIG. 3 to prevent any optical pulses from being coupled into or out of the re-circulating fiber loop 60 at times other than specified.

In steady-state operation, the laser diode source 45 generates a continuous train of optical pulses as input optical pulse stream 70, and the optical switch element 80 is periodically timed to open and close between first cross position 82 and second bar position 87. In the first position 82 indicated in FIG. 3, the optical switch element 80 admits a single pulse from optical pulse stream 70 for circulation and amplification within the loop and simultaneously or at substantially the same time, at each period, outputs an amplified optical pulse that has been sufficiently amplified to an intended amplitude and positioned along the re-circulating fiber loop 60 for output of the fiber loop 60. As will be described in greater detail herein below, each pulse admitted to the fiber loop 60 travels a predetermined length along the re-circulating fiber optic loop 60 and in each cycle of travel will be amplified by optical amplifier device or element 55 within the fiber loop 60. Thus, by carefully selecting or designing the length "L" of re-circulating optical fiber loop 60 and at a given pre-determined pulse width, initial input optical pulse amplitude, input optical pulse period, and a given gain of amplifier device or element 55, the apparatus 50 may be configured or programmed such that each input optical pulse admitted to the re-circulating optical fiber loop 60 will travel along the optical fiber loop 60 for one or more recirculation "cycles" to experience a total gain that is much higher than that of amplifier device 55, depending on the final amplified optical pulse amplitude as intended.

Figure 4:
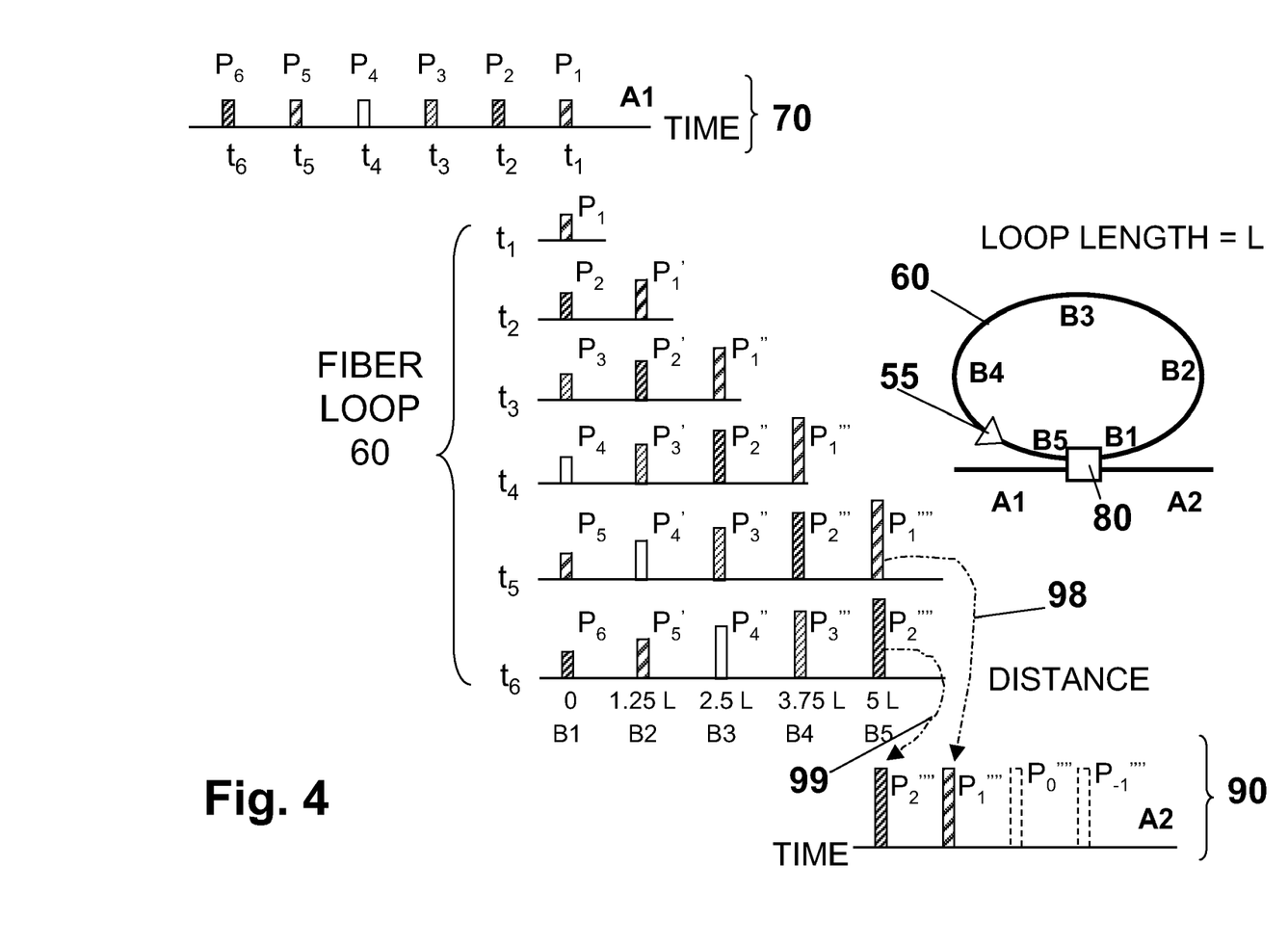
FIG. 4 depicts a timing diagram describing the composition of optical pulses $P_1$-$P_6$ along the re-circulating fiber loop 60 of at various times $t_1$-$t_6$ and the distances B1-B5 along the loop as a function of loop length "L" for the pulse amplification apparatus 50 depicted in FIG. 3.

This process of timing the optical switch element 80 to admit a single input optical pulse into the re-circulating fiber loop 60 at each period and, at the substantially same time, to output an amplified output optical pulse of sufficient optimal intensity and peak power for intended optical signal applications is further illustrated in FIG. 4. FIG. 4 particularly depicts a timing diagram illustrating the composition of optical pulses $P_1$-$P_6$ along the re-circulating fiber loop 60 of at various times $t_1$-$t_6$ and the distances B1-B5 along the loop as a function of loop length "L" where the pulse may be expected to be in its travel along the re-circulating fiber loop at each time. It is understood that, in FIG. 4, distances B1 and B5 are at the respective output and input sides of the optical switch element 80. Compared to the length of fiber, size of the optical switch may be negligible. Therefore, B1 and B5 (=5L in the example embodiment depicted) may be considered at virtually the same location.

In the example depicted in FIG. 4, in each cycle (which is the repetition cycle of input optical pulses, to which optical switch 80 is timed, and is different from one cycle of the fiber loop 60), an optical pulse travels a finite length, for example, 1.25L of the re-circulating fiber loop 60 and is amplified by optical pulse amplifier device 55. For example, at first time $t_1$, the first optical pulse $P_1$ of a predetermined power level is input to the re-circulating fiber loop 60. For purposes of illustration, the first optical pulse $P_1$ in the loop 60 at first time $t_1$ is shown at a location indicated as B1 at the input side of the optical switch element 80. For purposes of explanation, according to the example embodiment of the invention, after time $t_1$ and before time $t_2$, the first optical pulse $P_1$ has traveled the re-circulating fiber loop 60 for a length 1.25L of the re-circulating fiber loop 60 where it will be approximately at a location B2. By the time the cross-bar optical switch element 80 has again switched at time $t_2$, the first optical pulse $P_1$ has been amplified by amplifier 55 to a new power level $P_1'$.

Then, at a time $t_2$, the cross-bar optical switch 80 is triggered to admit a second optical pulse $P_2$ of a predetermined power level for input to the re-circulating fiber loop 60, e.g., at a distance indicated as B1 of the loop 60. Then, between time $t_2$ and $t_3$ it is assumed that the first optical pulse $P_1$ has again traveled the re-circulating fiber loop for a length 1.25L of the re-circulating fiber loop and has been amplified by the optical amplifier 55 to a new power level $P_1''$ shown at a distance B3 along the loop; and, the second optical pulse $P_2$ has traveled the re-circulating fiber loop for a length 1.25L of the re-circulating fiber loop and has been amplified by the optical amplifier 55 to a new power level $P_2'$ shown at a distance B2 along the loop.

Then, at a time $t_3$, the cross-bar optical switch element 80 is triggered to admit a third optical pulse $P_3$ of a predetermined power level for input to the re-circulating fiber loop 60, e.g., at a distance indicated as B1 along the loop 60. Then, between time $t_3$ and $t_4$ it is assumed that the first optical pulse $P_1$ has again traveled the re-circulating fiber loop for a length 1.25L of the re-circulating fiber loop and has been amplified by the optical amplifier 55 to a new power level $P_1'''$ shown at a distance B4 along the loop; and, the second optical pulse $P_2$ has traveled the re-circulating fiber loop for a length 1.25L of the re-circulating fiber loop and has been amplified by the optical amplifier 55 to a new power level $P_2'$ shown at a distance B3 along the loop; and, the third pulse $P_3$ has traveled the re-circulating fiber loop for a length 1.25L of the re-circulating fiber loop and has been amplified by the optical amplifier 55 to a new power level $P_3'$ shown at a distance B2 along the loop.

Then, at a time $t_4$, the cross-bar optical switch element 80 is triggered to admit a fourth optical pulse $P_4$ of a predetermined power level for input to the re-circulating fiber loop 60, e.g., at a distance indicated as B1 along the loop. Then, between time $t_4$ and $t_5$ it is assumed that the first optical pulse $P_1$ has again traveled the re-circulating fiber loop for a length 1.25L of the re-circulating fiber loop and has been amplified by the optical amplifier 55 to a new power level $P_1''''$ shown at a distance B5 along the loop; and, the second optical pulse $P_2$ has traveled the re-circulating fiber loop for a length 1.25L of the re-circulating fiber loop and has been amplified by the optical amplifier 55 to a new power level $P_2'''$ shown at a distance B4 along the loop; the third optical pulse $P_3$ has traveled the re-circulating fiber loop for a length 1.25L of the re-circulating fiber loop and has been amplified by the optical amplifier 55 to a new power level $P_3''$ shown at a distance B3 along the loop; and, the fourth optical pulse $P_4$ has traveled the re-circulating fiber loop for a length 1.25L of the re-circulating fiber loop and has been amplified by the optical amplifier 55 to a new power level $P_4'$ shown at a distance B2 along the loop.

Then, at a time $t_5$, the cross-bar optical switch element 80 is triggered to admit a fifth optical pulse $P_5$ of a predetermined power level for input to the re-circulating fiber loop 60, e.g., at a distance indicated as B1 of the loop 60. Simultaneously or at substantially the same time, at time t5, the output port of the optical switch is opened to enable egress of the first amplified optical pulse $P_1''$ which had been at a distance B5 of the loop. This first amplified pulse $P_1''$ is now output out of the re-circulating fiber loop 60 as the first amplified output optical pulse of power $P_1''$ of output optical pulse stream 90 as indicated by arrow 98. Then, between time $t_5$ and $t_6$ it is assumed that the second optical pulse $P_2$ has again traveled the re-circulating fiber loop for a length 1.25L of the re-circulating fiber loop and has been amplified by the optical amplifier 55 to a new power level $P_2''$ shown at a distance B5 along the loop; the third optical pulse $P_3$ has again traveled the re-circulating fiber loop for a length 1.25L of the re-circulating fiber loop and has been amplified by the optical amplifier 55 to a new power level $P_3'''$ shown at a distance B4 along the loop; the fourth optical pulse $P_4$ has again traveled the re-circulating fiber loop for a length 1.25L of the re-circulating fiber loop and has been amplified by the optical amplifier 55 to a new power level $P_4''$ shown at a distance B3 along the loop; the fifth optical pulse $P_5$ has traveled the re-circulating fiber loop for a length 1.25L of the re-circulating fiber loop and has been amplified by the optical amplifier 55 to a new power level $P_5'$ shown at a distance B2 along the loop.

Then, at a time $t_6$, the cross-bar optical switch element 80 is triggered to admit a sixth optical pulse $P_6$ of a predetermined power level for input to the re-circulating fiber loop 60, e.g., at a distance indicated as B1 along the loop 60, while the optical switch output port is simultaneously triggered to enable output of the amplified second optical pulse $P_2$ now at its amplified power level $P_2''''$ as the second amplified output optical pulse of power $P_2''''$ of output optical pulse stream 90 as indicated by arrow 99.

The process described herein with respect to the example embodiment depicted in FIG. 4 continues such that in steady state operation, at any time, there are always four (4) graded optical pulses located within the re-circulating fiber loop 60 at various stages of amplification as shown in FIG. 4, e.g., at times $t_5$, $t_6$, et seq. Most notably, in steady state operation, this set of optical pulses local to the re-circulating fiber loop 60 are being applied to the input of the optical amplifier 55 and have different amplitudes arranged in a graded, e.g., descending, order.

Figure 5:
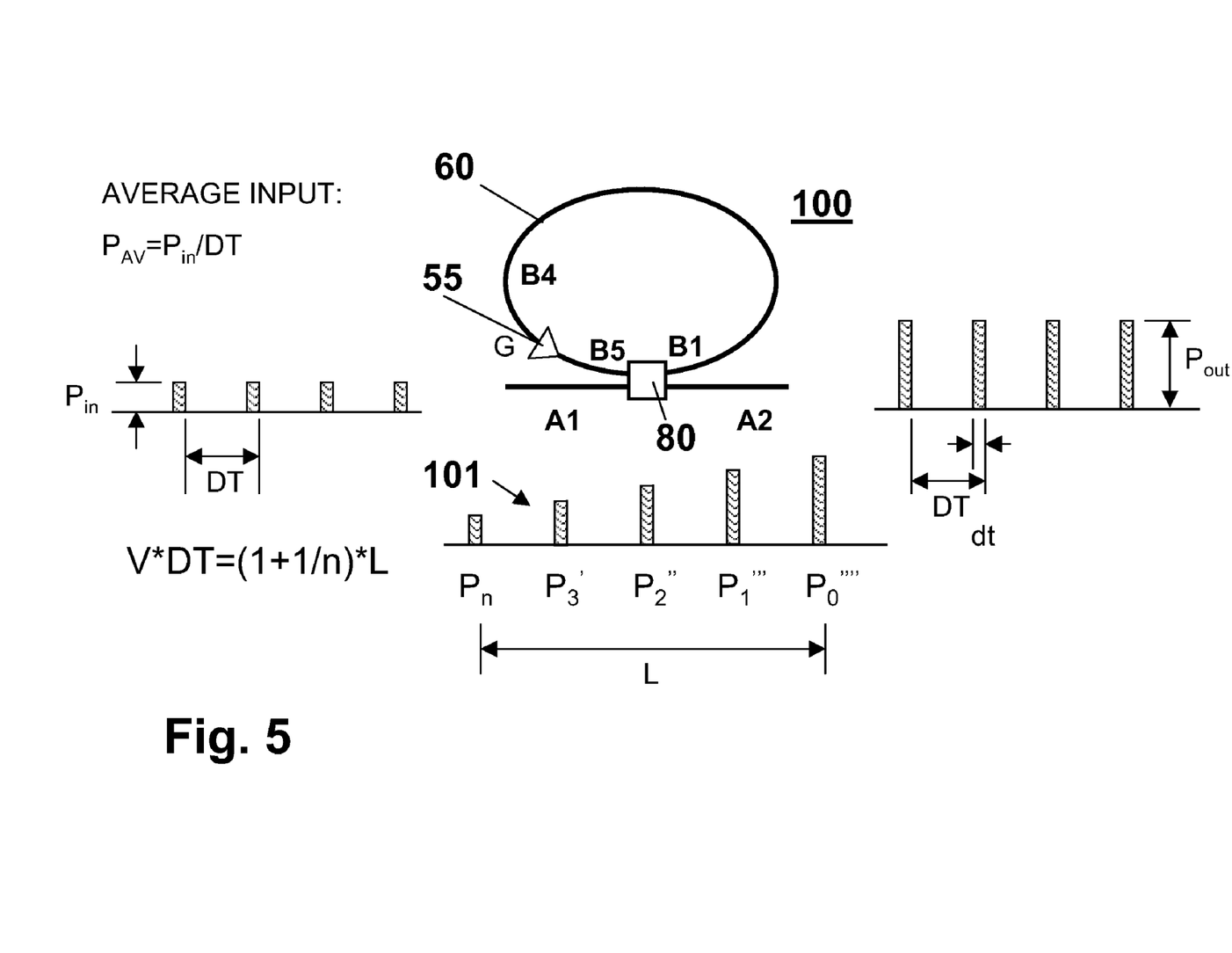
FIG. 5 shows an example pulse amplifier apparatus 100 where there are "n" pulses 101 labeled $P_0$ to $P_{n-1}$ in the re-circulating fiber optic loop 60 in steady state operation according to the example embodiment of the present invention.

From a pulse power perspective, as now shown in FIG. 5, the average pulse input power is shown according to the relation:

$$P_{av} = Pin/DT$$

where Pin is the peak power of input optical pulse and DT is the pulse repetition time (i.e., the input pulse train period, e.g., 10 ns).

For the example embodiment depicted in FIG. 4, given that V is the velocity of light inside the fiber loop, e.g., $V \approx 2 \times 10^8$ meters/sec, then, in one repetition time, an optical pulse would travel along the re-circulating fiber loop 60 a distance according to the relation:

$$V*DT = (1+1/n)*L$$

where L is the length of the re-circulating fiber loop and "n" is the number of cycles traveled by a pulse inside the fiber loop or the number of pulses that co-exist inside the loop. Thus, for the example embodiment depicted in FIG. 4, n=4 as there are always four (4) optical pulses located within the re-circulating fiber loop 60 at various stages of amplification as shown in FIG. 4. That is, in one repetition time, the distance traveled by one optical pulse along the re-circulating fiber loop line is 5/4L or 1.25L as described in the example embodiment herein with respect to FIG. 4.

Generalizing now, FIG. 5 shows an example pulse amplifier apparatus 100 where there are "n" pulses 101 labeled $P_0$ to $P_{n-1}$ in the re-circulating fiber optic loop 60 in steady state operation. The average input power $P_i$ that the optical amplifier 55 in the re-circulating fiber loop is subject to is governed according to the following relations:

$$P_i = (P_0'''' + P_1''' + P_2'' + P_3' + \ldots + P_n)/DT/(n+1)$$
$$= (P_{in}/DT)*(G^n + G^{n-1} + G^{n-2} + \ldots + 1)/(n+1)$$
$$= P_{AV}*(1 - G^{n+1})/(1 - G)/(n+1)$$

where G is the gain of the optical amplifier shown in FIG. 5. Here, since during each repetition cycle of input optical pulses, an optical pulse travels (1+1/n) turns of the fiber loop, average input power $P_i$ into optical amplifier 55 is the average of total powers of n+1 optical pulses (instead of n pulses), that is, $P_0$ to $P_n$.

The average output power, Po, is governed according to the relation:

$$P_o = P_i*G$$

and the peak power of output pulse, Pout, is governed approximately according to the relation:

$$Pout = Pin*G^{n+1}.$$

Thus, for example, given n=4, G=10 dB, Pin=−12.5 dBm and $P_{AV}$=−32.5 dBm (assuming a 1:100 pulse duration/repetition ratio, dt/DT), the following may be calculated by the above formulae:

$Pi=1$ dBm $Po=11.0$ dBm $Pout=37.5$ dBm

In another example, given n=3, G=10 dB, Pin=−13.5 dBm and $P_{AV}$=−23.5 dBm (assuming a 1:10 pulse duration/repetition ratio), the following may be calculated by the above formulae:

$Pi=1$ dBm $Po=11.0$ dBm $Pout=26.5$ dBm

Thus, the present invention has several distinct advantages as it provides: 1) extremely high gain for narrow optical pulses by emulating multiple amplifiers, and, 2) lowered average input power (because of graded pulse series) for delayed amplifier saturation at higher input pulse power resulting in even higher peak power of output pulses.

Figure 6:
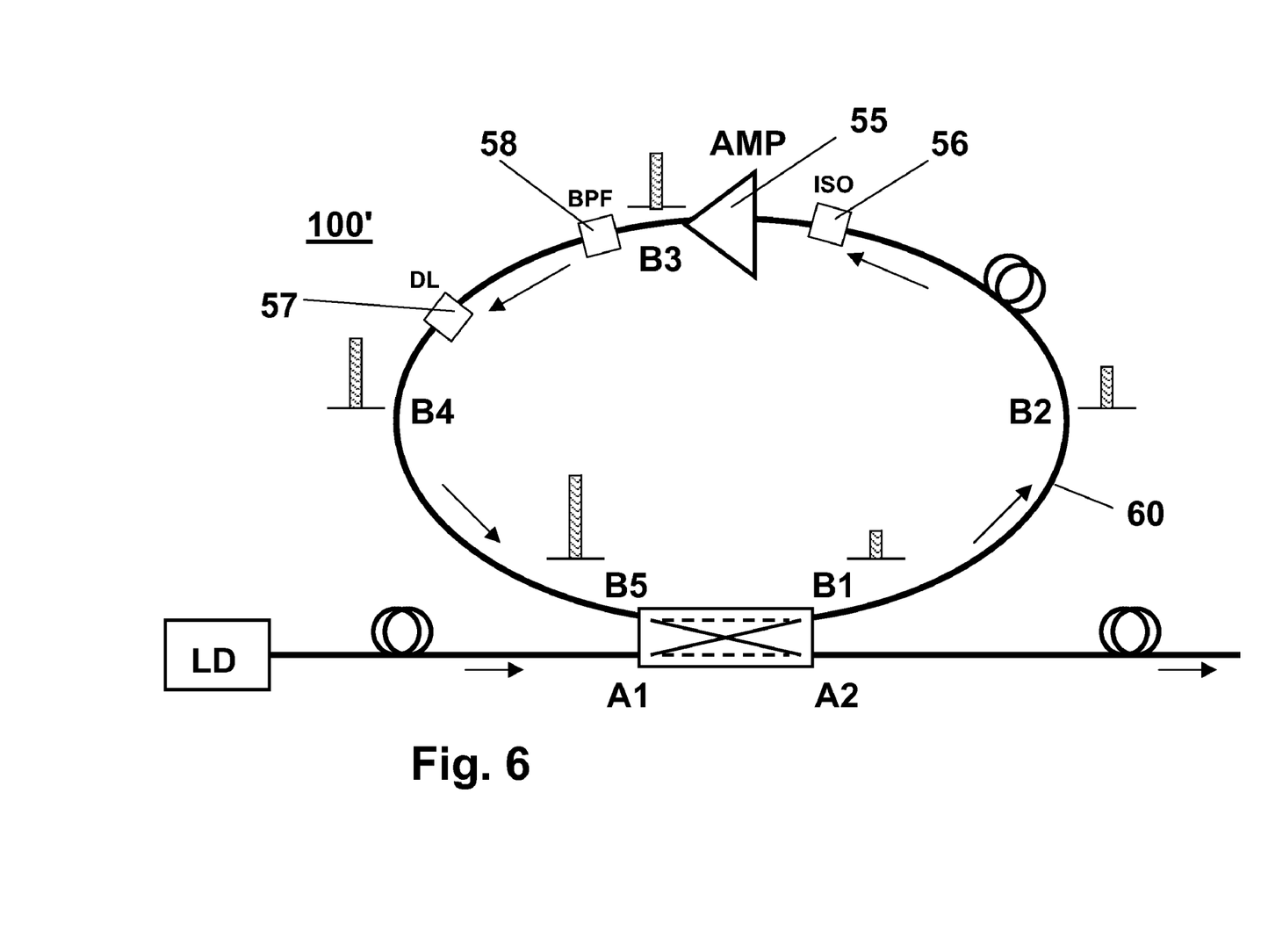
FIG. 6 shows an example pulse amplification apparatus 100' according to an example embodiment of the present invention.

While the embodiment of the invention depicted in FIGS. 3-5 show the optical pulse amplifier device at a distance between B4 and B5 along the length of the re-circulating fiber loop, it is understood that the amplifier may be positioned at any location within the re-circulating fiber loop, e.g., such as at a distance B3 along the length of the re-circulating fiber loop 60 as shown in the example apparatus 100' shown in FIG. 6, for optimum gain and noise reduction. Moreover, as further shown in the example apparatus 100' of FIG. 6, the re-circulating fiber loop 60 may be equipped with further opto-electronic components, including, but not limited to: an Optical isolator component 56 for preventing potential lasing of an optical signal; an Optical delay line element 57 for adjusting pulse separation inside loop; and, an Optical band-pass filter 58 for use in reducing ASE (Accumulated Spontaneous Emission) noise accumulation.

Figure 7:
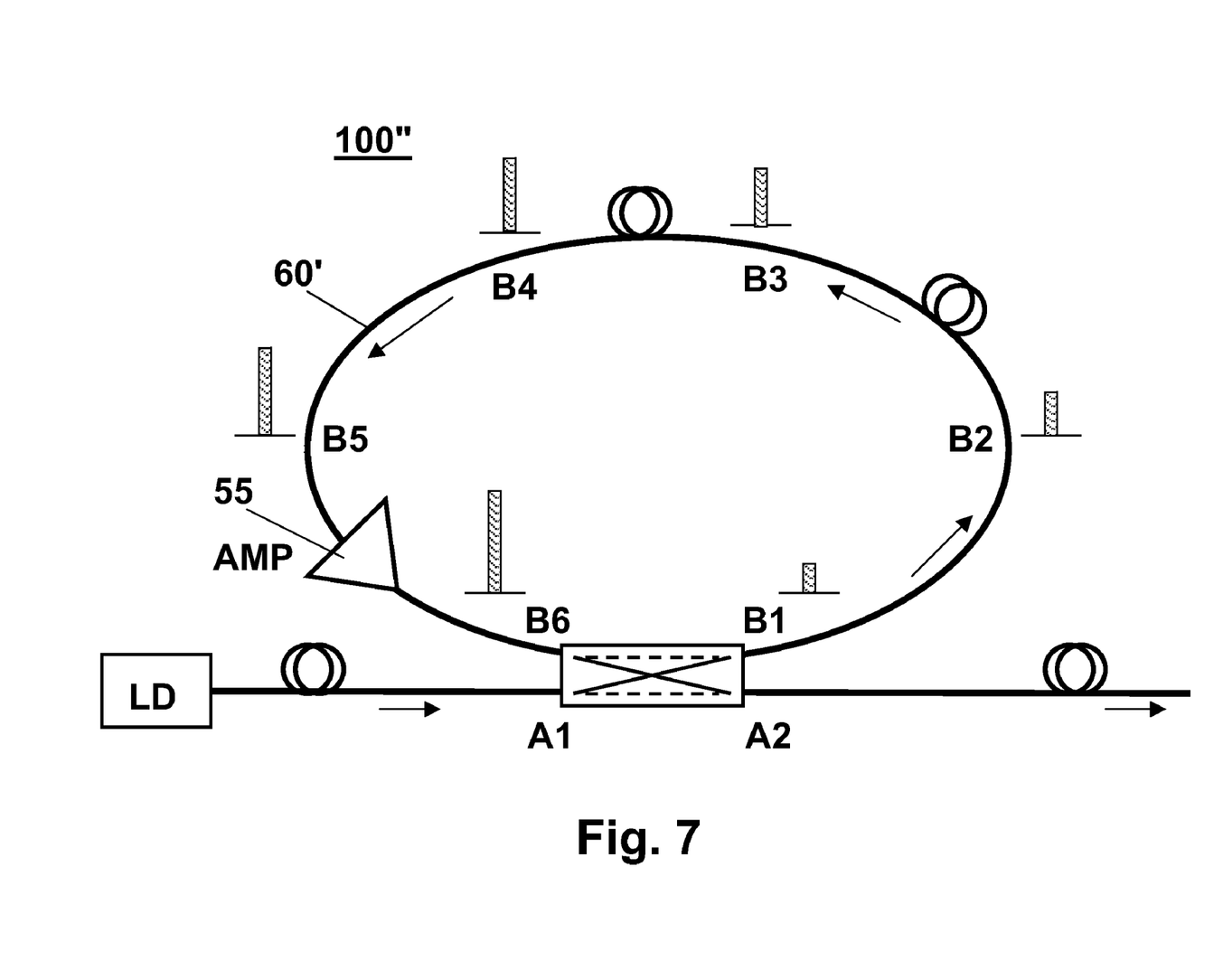
FIG. 7 shows an example pulse amplification apparatus 100" according to an example embodiment of the present invention.

Furthermore, as shown in the example apparatus 100" shown in FIG. 7, it is understood that the length of re-circulating fiber loop 60' may be different according to intended design parameters such as: the number of re-circulation cycles necessary to achieve a predetermined total optical pulse gain.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. An apparatus for providing high gain to optical pulse signals comprising:
   a re-circulating fiber optic loop having an optical amplifier coupled therein for emulating multiple optical signal amplifiers; and,
   an optical switch means coupled to said re-circulating fiber optic loop and timed to admit successive optical input pulses of constant amplitude from an optical pulse source into said fiber optic loop for circulation therein, and at substantially the same time and at each admission during steady state operation, output an optical pulse that has achieved a predetermined amount of amplitude amplification after a pre-determined number of re-circulation cycles within said fiber optic loop, wherein each pulse admitted into said loop being amplified by said optical amplifier in each re-circulating cycle, each successively admitted pulse always having an increased amplitude compared to each successive optical pulse admitted in said fiber optic loop, whereby during steady state operation, a fixed number of local optical pulses is circulating in said fiber optic loop each at a successively greater amplitude.

2. The apparatus of claim 1, wherein the optical path length of said fiber optic loop is adapted to be a multiple of the distance between said local optical pulses.

3. The apparatus of claim 2, wherein said fiber optic loop further comprises an optical delay line for adjusting said optical path length.

4. The apparatus of claim 1, wherein said optical switch means is synchronized to a time interval equal to a time that a local optical pulse travels one and 1/n cycles of the fiber optic loop, wherein n equals the number of optical pulses in said set of local optical pulses.

5. A method for providing high gain to optical pulse signals comprising:

providing a re-circulating fiber optic loop having an optical amplifier coupled therein for emulating multiple optical signal amplifiers; and timing an optical switch coupled to said re-circulating fiber optic loop to successively admit optical input pulses of constant amplitude from an optical pulse source into said fiber optic loop for circulation therein, and at substantially the same time, to successively output an optical pulse that has achieved a predetermined amount of amplitude amplification after a pre-determined number of re-circulation cycles within said fiber optic loop, wherein each pulse admitted into said loop being amplified by said optical amplifier in each re-circulating cycle, each successively admitted pulse always having an increased amplitude compared to each successive optical pulse admitted in said fiber optic loop, whereby during steady state operation, a fixed number of local optical pulses is circulating in said fiber optic fiber loop each at a successively greater amplitude.

6. The method of claim 5, wherein the optical path length of said fiber optic loop is adapted to be a multiple of the distance between said local optical pulses.

7. The method of claim 6, wherein said fiber optic loop further comprises an optical delay line for adjusting said optical path length.

8. The method of claim 5, wherein said optical switch is synchronized to a time interval equal to a time that a local optical pulse travels one and 1/n cycles of the fiber optic loop, wherein n equals the number of optical pulses in said set of local optical pulses.

* * * * *